United States Patent
Tullberg et al.

(10) Patent No.: US 10,635,936 B2
(45) Date of Patent: Apr. 28, 2020

(54) METHOD AND SYSTEM FOR TRAINING A NEURAL NETWORK TO CLASSIFY OBJECTS OR EVENTS

(71) Applicant: Axis AB, Lund (SE)

(72) Inventors: Joacim Tullberg, Lund (SE); Viktor Andersson, Lund (SE)

(73) Assignee: AXIS AB, Lund (SE)

( * ) Notice: Subject to any disclaimer, the term of this patent is extended or adjusted under 35 U.S.C. 154(b) by 158 days.

(21) Appl. No.: 16/011,688

(22) Filed: Jun. 19, 2018

(65) Prior Publication Data

US 2019/0005353 A1 Jan. 3, 2019

(30) Foreign Application Priority Data

Jun. 30, 2017 (EP) .................................. 17178915

(51) Int. Cl.
*G06K 9/62* (2006.01)
*G06K 9/00* (2006.01)
*G06N 3/08* (2006.01)

(52) U.S. Cl.
CPC ....... *G06K 9/6256* (2013.01); *G06K 9/00771* (2013.01); *G06K 9/6227* (2013.01); *G06K 9/6263* (2013.01); *G06K 9/6267* (2013.01); *G06K 9/6269* (2013.01); *G06K 9/6288* (2013.01); *G06N 3/08* (2013.01)

(58) Field of Classification Search
CPC ............. G06K 9/6256; G06K 9/00771; G06K 9/6227; G06K 9/6263; G06K 9/6267; G06K 9/6269; G06K 9/6288; G06N 3/08

USPC ........................................................ 382/159
See application file for complete search history.

(56) References Cited

U.S. PATENT DOCUMENTS

| | | | | |
|---|---|---|---|---|
| 2002/0169583 | A1* | 11/2002 | Gutta ................... | A61B 5/7264 702/188 |
| 2010/0210975 | A1* | 8/2010 | Anthony, III ........ | A61B 5/0002 600/595 |
| 2016/0092735 | A1* | 3/2016 | Govil ..................... | G06K 9/605 382/103 |

(Continued)

OTHER PUBLICATIONS

European Search Report dated Nov. 23, 2017 for Application No. 17178915.9-1901.

(Continued)

*Primary Examiner* — Ali Bayat
(74) *Attorney, Agent, or Firm* — Xsensus LLP

(57) ABSTRACT

A method includes receiving a first set of sensor data including data representing an object or an event in a monitored environment, receiving a second set of sensor data representing a corresponding time period as a time period represented by the first set of sensor data, inputting to a tutor classifier data representing the first set of data and including data representing the object or the event, generating a classification of the object or event in the tutor classifier, receiving the second set of sensor data at an apprentice classifier training process, receiving the classification generated in the tutor classifier at the apprentice classifier training process, and training the apprentice classifier in the apprentice classifier training process using the second set of sensor data as input and using the classification received from the tutor classifier as a ground-truth for the classification of the second set of sensor data.

11 Claims, 5 Drawing Sheets

(56) References Cited

U.S. PATENT DOCUMENTS

2016/0094800 A1* 3/2016 Gousev ............. G06K 9/00986
348/310
2018/0150713 A1* 5/2018 Farooqi ............... G06K 9/4604
2018/0150727 A1* 5/2018 Farooqi ............... G06K 9/4652
2018/0314921 A1* 11/2018 Mercep ................ G01S 13/862

OTHER PUBLICATIONS

Pan, S.J., et al., "A Survey on Transfer Learning", IEEE Transactions on Knowledge and Data Engineering, vol. 22, No. 10, pp. 1345-1359 (Oct. 2010).

Lu, J., et al., "Transfer Learning Using Computational Intelligence: A Survey", Knowledge-Based Systems, vol. 80, pp. 14-23 (Jan. 22, 2015).

Kandaswamy, C., et al., "Improving Deep Neural Network Performance by Reusing Features Trained with Transductive Transference", Wermter S. et al. (Eds.) ICANN 2014, LNCS, vol. 8681, pp. 265-272 (2014).

* cited by examiner

METHOD AND SYSTEM FOR TRAINING A NEURAL NETWORK TO CLASSIFY OBJECTS OR EVENTS

The present application claims priority to European Patent Application, 17178915.9, filed Jun. 30, 2017, the entire contents of which being incorporated herein by reference.

TECHNICAL FIELD OF THE INVENTION

The present invention relates to a method and system for training a neural network to classify objects or events.

BACKGROUND OF THE INVENTION

Classification of objects and/or of events may be achieved by means of a neural network, sometimes also referred to as artificial intelligence AI. The trend right now is of an increased use of these technologies for classifying objects or events from captured still images or video. These classifying neural networks are often used in applications like character recognition, monitoring, surveillance, image analysis, natural language processing etc. There are many neural network algorithms/technologies that may be used for classifying objects, e.g. Convolutional Neural Networks, Recurrent Neural Networks, etc.

A general training setup 10 for training a general neural network 12 for classification is shown in FIG. 1a. The neural network 12 is fed labeled data 14. The labeled data 14 is for example an image of an object to be classified, wherein the image is labeled with the correct class, i.e. the labeled data 14 includes the ground truth 18 of the image data 16 and the image data 16 itself. The image data 16 is inputted to the classifier and the ground truth 18 is sent to a loss function calculator 20. The classifier 12 processes the data representing an object to be classified and generates a classification identifier 22. The processing in the classifier includes applying weights to values as the data is fed through the classifier 12. The classification identifier 22 may be a feature vector, a classification vector, or a single value identifying a class. In the loss function the classification identifier 22 is compared to the ground truth 18 using, e.g. a loss function. The result from the loss function 24 is then transferred to a weight adjustment function 26 that is configured to adjust the weights used in the classifier 12. Then when the classifier 12 is fully trained it may be used as depicted in FIG. 2, wherein a classification is performed by loading the data 30 to be classified into the classifier 12. The data 30 to be classified is in the same form as the labeled data used during training, but without the label. The classifier 12 then output data 32 identifying the class determined for the data inputted.

To achieve a properly trained classifier a very large number of labeled data instances is required, e.g. labeled images. Generally hundreds of thousands of instances of labeled data is required, in many cases even millions. This training data is very cumbersome to generate. For some classifications you may buy large labeled data sets. The most common data sets includes images that are classified. One problem with these existing data sets is that they may not be labeled with the classes you would like to train your classifier to recognize. Another problem with the existing data sets is that they may not use the form of input data that you would like to make your classification on.

The classifier may be any type of neural network, artificial intelligence, or machine learning scheme. In the present description an artificial intelligence includes a neural network, hence when we describes neural networks it also applies to any artificial intelligences including such neural networks. A neural network to be used as a classifier may be implemented in a lot of different ways known to the skilled person. Neural networks sometimes are referred to as artificial neural networks.

SUMMARY OF THE INVENTION

One object of the present invention is to make training of a classifier less labour intensive.

The object is achieved by means of a method for training a classifier according to claim 1. Further embodiments of the invention are presented in the dependent claims.

More precisely, according to one aspect of the invention, a method for training a classifier comprises:
receiving a first set of sensor data including data representing an object or an event in a monitored environment,
receiving a second set of sensor data representing a corresponding time period as a time period represented by the first set of sensor data,
inputting to a tutor classifier data representing the first set of data and including data representing the object or the event,
generating a classification of the object or event in the tutor classifier,
receiving the second set of sensor data at an apprentice classifier training process,
receiving the classification generated in the tutor classifier at the apprentice classifier training process,
training the apprentice classifier in the apprentice classifier training process using the second set of sensor data as input and using the classification received from the tutor classifier as a ground-truth for the classification of the second set of sensor data.

One advantage of the above method is that it enables training a classifier for a new set of sensor data using an already trained classifier operating on a first set of sensor data, wherein the data of the second set of sensor data represent the same object or event as the first set of sensor data and during a corresponding time period.

In other embodiments the first set of sensor data sent to the tutor classifier is a subset of the first set of sensor data including the object or the event, wherein the subset of the first set of sensor data represents sensor data relating to a spatial position of the object or the event in a monitored environment, and wherein the second set of sensor data sent to the apprentice neural network represents a subset of the second sensor data, wherein the subset of the second sensor data represents data relating to the corresponding spatial position in the monitored environment as the subset of the first set of sensor data. The advantage of using the spatial position from the first set of sensor data of the object to classify may be that the identification of the corresponding object is facilitated in situations where multiple objects are present at least in the second data set. Further, the use of the spatial position may facilitate and/or speed up finding the object from the first set of sensor data in the second set of sensor data.

In some embodiments the first set of sensor data and the second set of sensor data are generated by the same sensor. This is advantageous for sensors that are enabled to provide various types of sensor data. For example, an image sensor may provide still image data and video data, i.e. in cases wherein the sensor is an image sensor the first set of sensor data may be a still image and the second set of sensor data may be a sequence of video frames.

In yet other embodiments the first set of sensor data is generated by a first sensor and the second set of sensor data is generated by a second sensor. This is advantageous in cases when it is desired facilitating training classification of another type of sensor data than the available classifier is capable of classifying. By using such an embodiment, there is no need to go through the process of manually creating training data, hence the training process is facilitated. In other embodiments the first sensor and the second sensor are arranged to generate data from different types of sensor inputs. To train a classifier to classify data of a different type than an already trained classifier is trained on also facilitate the training process as there is no need to manually create a labelled training set of data for the type of data represented by the second set of data.

According to some embodiments the first sensor is an image sensor and wherein the second sensor is any sensor type from the group of radar sensor, audio sensor, sound field sensor, LIDAR sensor, sensor for laser absorption spectroscopy, sonar sensor, radiation sensor, X-ray sensor, ultra sound. According to yet other embodiments the image sensor is a sensor registering visible light. In other embodiments the first sensor is a sensor registering visible light and the second sensor is a sensor registering infra-red light.

In some embodiments the tutor classifier is based on a neural network and according to some embodiments the apprentice classifier is based on a neural network.

According to another aspect of the invention a system arranged to train a classifier comprising a tutor classifier arranged to receive a first set of sensor data including data representing an object or an event in a monitored environment and to generate a classification of the object or event, an apprentice classifier arranged to be trained wherein the training includes receiving a second set of sensor data representing a corresponding time period as a time period represented by the first set of sensor data, a loss value calculator arranged to receive an output classification from the tutor classifier, to receive an output classification from the apprentice classifier, and to calculate a loss value identifying a difference between the two received classifications, and a weight adjuster arranged to adjust weights in the apprentice classifier in response to the loss value calculated by the loss value calculator. One advantage of the above system is that it enables training a classifier for a new set of sensor data using an already trained classifier operating on a first set of sensor data, wherein the data of the second set of sensor data represent the same object or event as the first set of sensor data and during a corresponding time period.

In some embodiments the system further comprises a sensor generating both the first set of sensor data and the second set of sensor data. This is advantages for sensors that are enabled to provide various types of sensor data. For example, an image sensor may provide still image data and video data, i.e. in cases wherein the sensor is an image sensor the first set of sensor data may be still image and the second set of sensor data may be a sequence of video frames.

In other embodiments the system further comprises a first sensor generating the first set of sensor data and a second sensor generating the second set of sensor data. This is advantageous in cases when it is desired facilitating training classification of another type of sensor data than the available classifier is capable of classifying. By using such an embodiment, there is no need to go through the process of manually creating training data, hence the training process is facilitated.

In some embodiments a sensor is an image sensor.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF EMBODIMENTS

The present invention relates to classifiers that are being configured to classify objects and/or events by means of processing data from a sensor. In particular the invention relates to having a first classifier already configured to classify objects and/or events from a first set of data provided by a sensor to assist in configuring a second classifier to classify objects and/or events from a second set of data provided by the same or a different sensor. The first classifier may be seen as teaching the second classifier and therefore the first classifier will be referred to as tutor classifier and the second classifier will be referred to as apprentice classifier.

In some embodiments the tutor classifier is configured to classify data from an image sensor, e.g. a sensor for capturing images from visible light or infra-red light. One advantage of having the tutor classifier configured to classify objects and/or events based on data from a visible light image sensor is that there are a lot of labelled data sets already prepared for this type of data and, thus, this will facilitate the training of such a classifier. There may even be pre-configured classifiers that may be used.

The apprentice classifier may be configured to be trained to classify data from any type of sensor for which it is possible to correlate a classification made by the tutor classifier. The apprentice classifier may be trained to classify data from the same sensor or same type of sensor as the tutor classifier is trained to classify, but in a different form. According to some embodiments the apprentice classifier is to be trained to classify data from a second sensor. The second sensor may for example be a visible light image sensor, an infra-red light image sensor, a radar sensor, a microphone, a microphone matrix, a sound field sensor, ultra sound, a Lidar sensor, a sensor for laser absorption spectroscopy, a sonar sensor, a radiation sensor, an X-ray sensor, etc.

Figure 1:
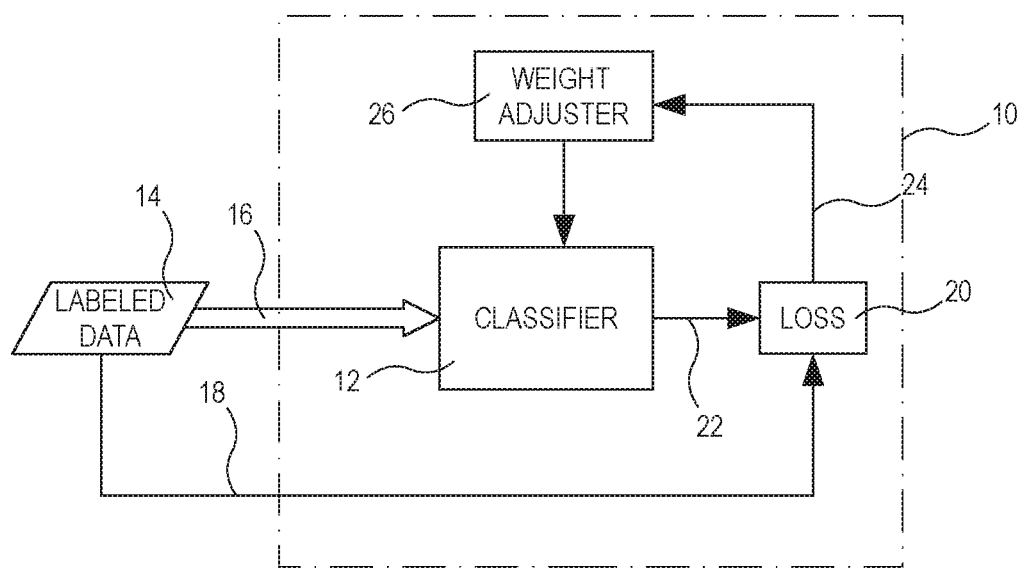
FIG. 1 is a schematic block diagram of a training system for training a classifier in accordance with prior art.
Figure 2:
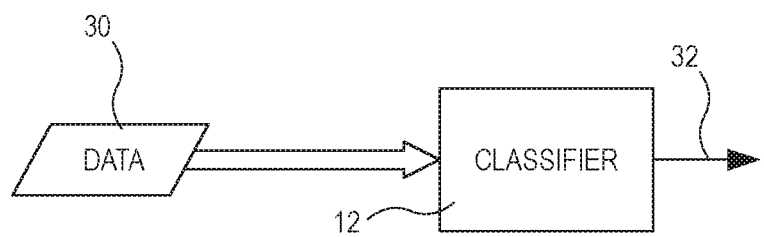
FIG. 2 is a schematic block diagram of a prior art classifier when used after training.
Figure 3:
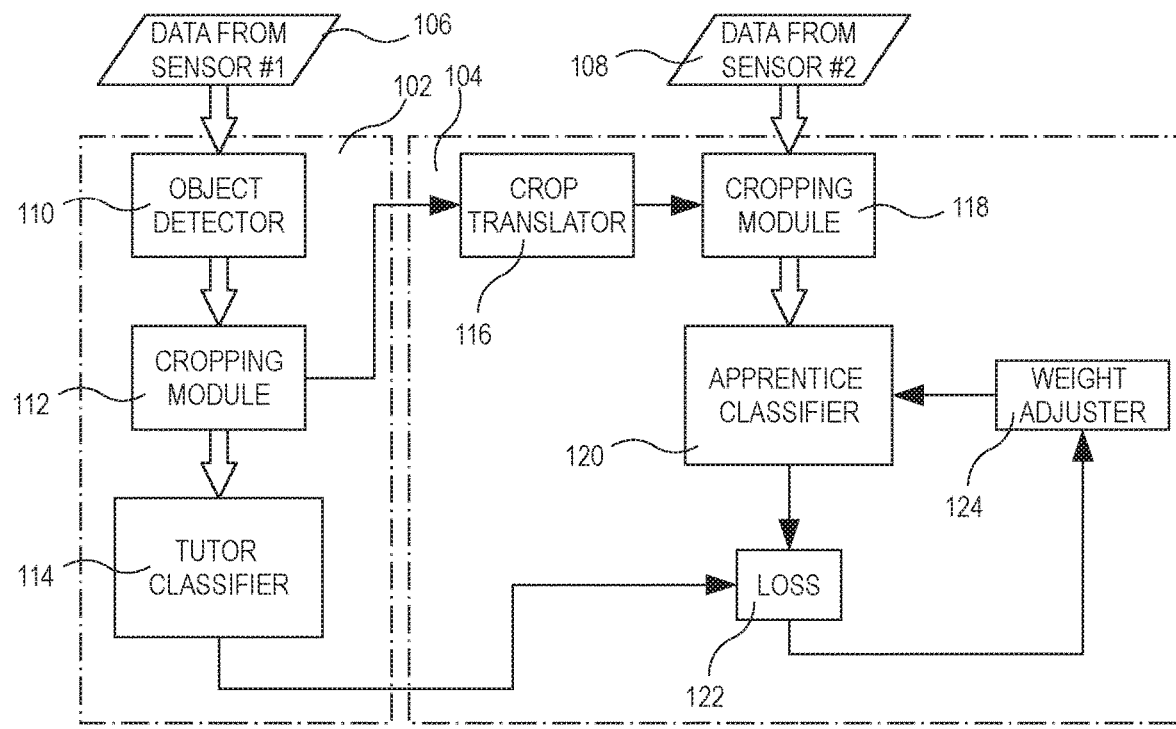
FIG. 3 is a schematic block diagram of a training system for training a classifier according to an embodiment of the invention.

Now referring to FIG. 3 depicting an example of a system arranged for making one classifier configure or train another classifier to classify. The system includes a configured and/or trained tutor classification module 102 and an apprentice classification module 104 to be configured and/or trained. The tutor classification module 102 is arranged to receive sensor data from a first sensor 106 and the apprentice classification module 104 is arranged to receive data from a second sensor 108. The first sensor 106 is, in this example, an image sensor delivering two dimensional image of a scene.

The tutor classification module includes an object detector 110, a cropping module 112, and a tutor classifier 114. The object detector 110 may be any kind of object detector arranged to detect objects in a two dimensional image that is known to the skilled person. The object detector 110 is arranged to detect objects appearing in the image of the scene captured in data received from the first sensor 106. The cropping module 112 is arranged to extract a subset of the data from the first sensor 106 and transmit the extracted subset of data to the tutor classifier 114. The subset to be extracted is determined by the position and size of the object detected in the object detector 110. The cropping area may be of rectangular shape and be somewhat larger than the object. In addition to cropping the data by extracting said subset of data and sending the subset of data to the tutor classifier the cropping module 112 transfer information of the position of the detected object to the apprentice classification module 104. Moreover, in addition to transferring the position of the detected object to the apprentice classification module the cropping module may be arranged to transfer any one of the following features: area of the cropped area, width of the cropped area, height of the cropped area, direction to the cropped area.

The tutor classifier 114 processes the cropped image data and generates an indicator that indicates the class of the detected object. The indicator may be a feature vector, a classification vector, a single value or it may be a data set indicating the class and the likelihood of the object being correctly classified, i.e. the confidence value for the indicated class. The class indicator or a filtered version of the class indicator is then transferred to the apprentice classification module 104. The filtered version may be a class indicator in which a limited number or a single one class indicator having the best confidence value/s are transferred to the apprentice classification module. Moreover, in some embodiments a class indicator may be stopped from being transferred if the confidence value is below a predetermined threshold.

The apprentice classification module 104 includes a crop translator 116, a cropping module 118, an apprentice classifier 120, a loss function calculator 122, and a weight adjuster 124. The crop translator 116 is arranged to translate the information relating to the cropping performed in the cropping module 112 in the tutor classification module 102 into a corresponding position represented in the data from the second sensor 108.

Figure 4A:
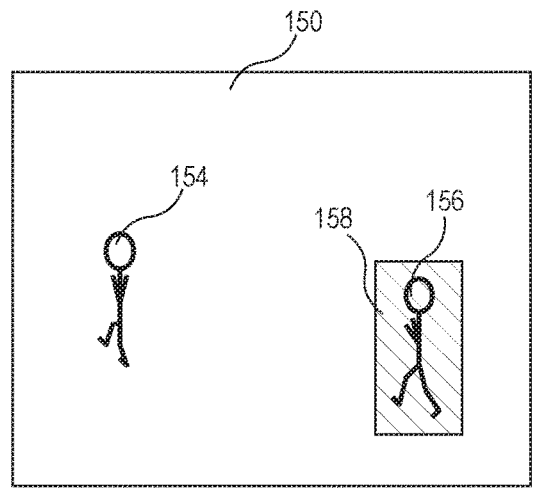
FIG. 4a is a schematic view of sensor data of a scene captured by an image sensor.
Figure 4B:
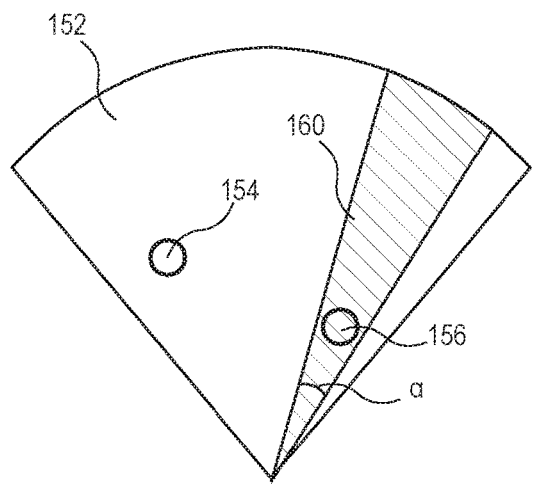
FIG. 4b is a schematic view of sensor data of the corresponding scene of FIG. 4a, but captured by a radar sensor.

This translation is illustrated in FIGS. 4a-b in which FIG. 4a depicts an image 150 captured by an image sensor, e.g. visible light image sensor or infra-red image sensor and FIG. 4b depicts a representation 152 of sensor data from a radar sensor at a corresponding time period as the capturing of the image in FIG. 4a. The image in FIG. 4a shows two persons 154, 156 in the captured scene. An object detector, such as the one 110 in the tutor classification module 102 will probably detect both persons 154, 156, however, the system should only classify one object at a time. Let us assume that the classifying module is in the stage to process the person 156 to the right and the hatched area 158 indicates that this is the detected object and the cropping module 112 has determined the area to crop, indicated by the hatched area 158. The information relating to the cropping determined in the cropping module 112 is then transferred to the crop translator 116 of the apprentice classification module 104, as previously mentioned. The crop translator 116 will in this case translate the position to a corresponding direction in the data of the radar sensor, indicated by the hatched sector 160 in FIG. 4b. The angle α may be determined from the width of the cropping area 158 in FIG. 4a or may be determined on an independent object detection for the radar data in the determined direction.

Now returning to FIG. 3 and the description of the features of the apprentice classification module 104. The cropping module 118 is arranged to extract a subset of data from the second sensor 108. The selection of the subset of data to be extracted is at least partially determined using data from the crop translator. The apprentice classifier 120 is arranged to receive the cropped data from the cropping module 118 and generate a value or a vector of values indicating an estimated class for the corresponding object in the data from the second sensor 108. The loss function calculator 122 is arranged to evaluate the result from the apprentice classifier 120 in comparison to the ground truth provided from the tutor classifier 114. In machine learning the ground truth is, for the example of classifiers, the class of the object which is provided as the correct class for the particular image, i.e. by manual labelling of objects. This evaluation results in an output that is used for adjustment of the processing in the apprentice classifier 120, e.g. by adjusting weights in various process steps. The weight adjuster 124 is arranged to use this evaluation result from the loss function 122 and generate the appropriate weight adjustments for the apprentice classifier 120 in order to get closer to a correct classification.

Figure 5:
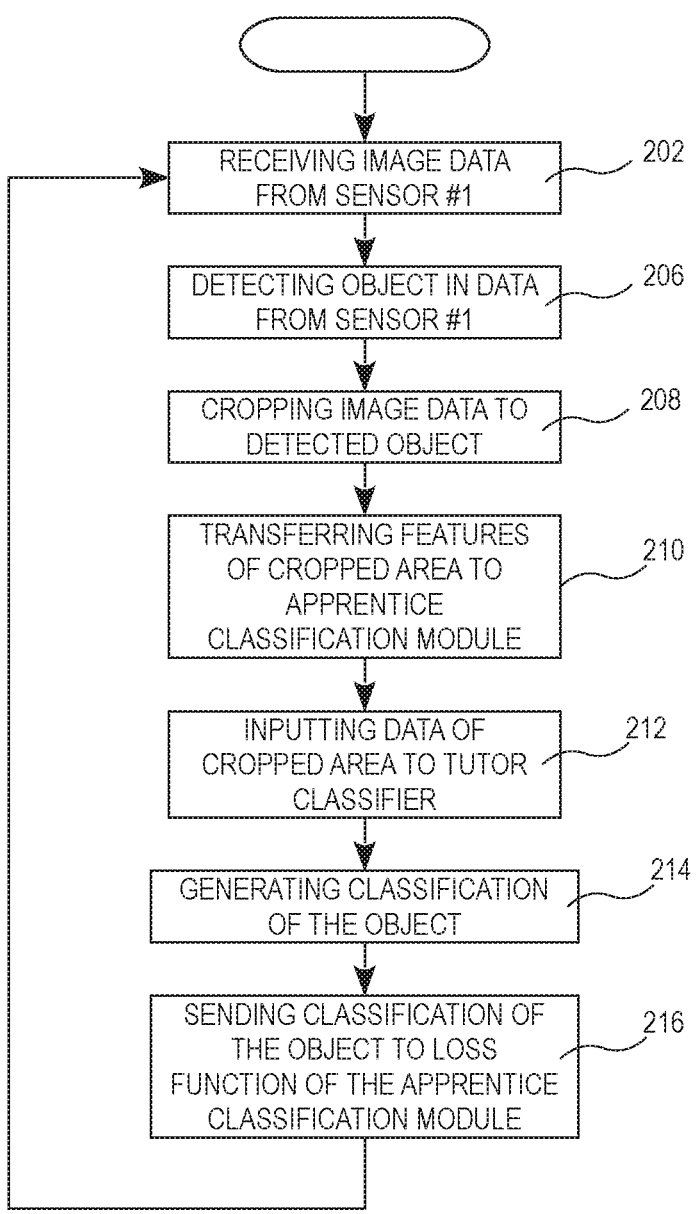
FIG. 5 is a flowchart of a classification process being part of the training process according to an embodiment of the invention.
Figure 6:
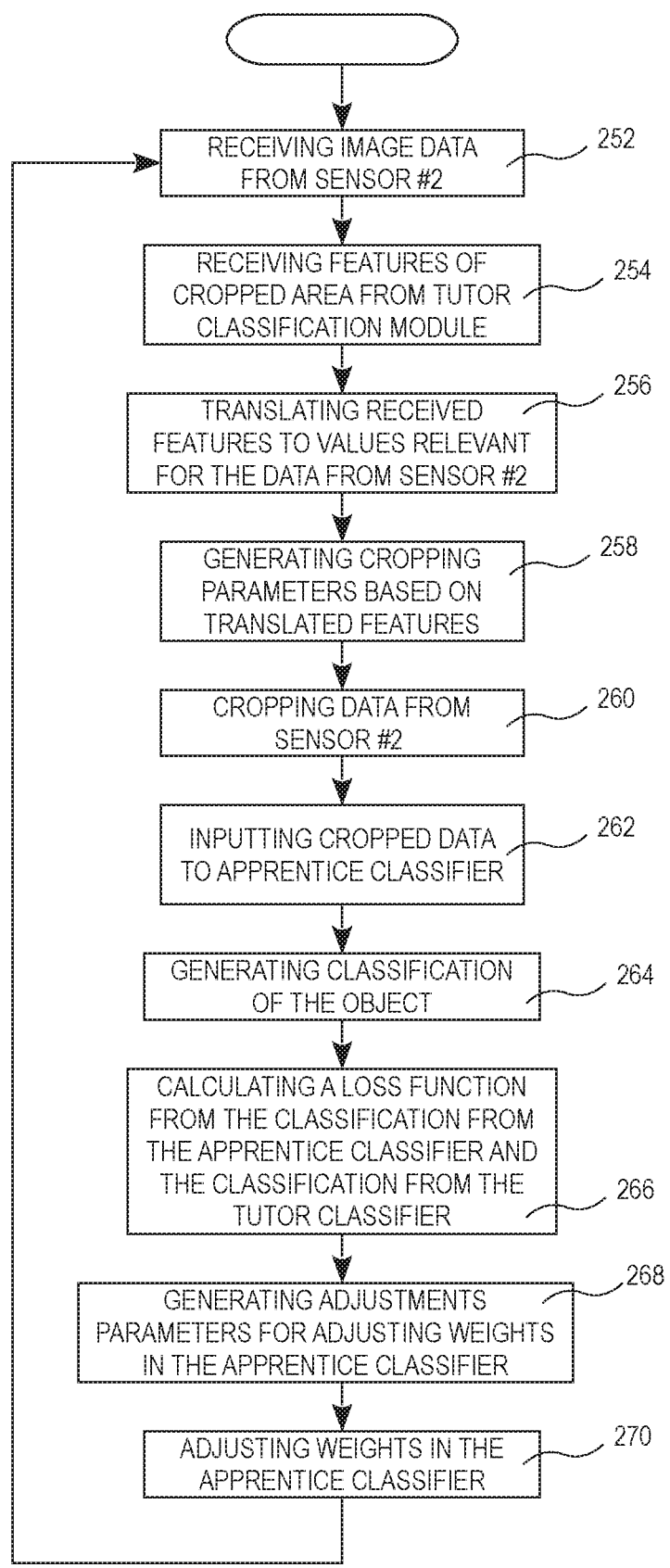
FIG. 6 is a flowchart of an learning process for an apprentice neural network being part of the training process according to an embodiment of the invention.

Now referring to FIGS. 5 and 6 showing an example process for the training of a classifier. FIG. 5 shows a portion of the training process relating to the processing of the data from the first sensor 106 and generating of data for use in training the classification of the data from the second sensor 108. FIG. 6 shows a portion of the training process relating to the processing of the data from the second sensor 108 and the adjustment of weights in the apprentice classifier using inputs from the processing of data from the first sensor 106.

A training loop starts with the input of two data sets from the two sensors 106, 108. Accordingly the process receives data from the first sensor 106, step 202 in FIG. 5, and from the second sensor 108, step 252 in FIG. 6. The first sensor 106 being an image sensor as described above. The data registered by the two sensors 106, 108, are registered by each sensor 106, 108, at corresponding points in time, i.e. the data is captured at the two sensors, respectively, at a short temporal distance or for overlapping time periods in order to make it likely that the two sensors capture data relating to the same object, or event.

Now let us take a look at the processing of the data from the first sensor 106 in FIG. 5. After the image sensor data have been received, when it has been captured by the first sensor 106, step 202, the process continues by detecting an object in the data from the first sensor 106, step 206. The detected object is then analysed for cropping and a subset of data representing the detected object is selected, i.e. cropped, step 208. Further, data relating to one of or any combination of the following features relating to the detected object is determined and transferred, step 210, for use in a cropping operation to be performed on the data from the second sensor 108 in the apprentice classification module 104. The features are: a position of the detected object, an indication of the area occupied by the object, the width of the cropped area, the height of the cropped area, The cropped data from the first sensor is then inputted to the tutor classifier 114, step 212, and a classification identifier is generated, step 214, by the tutor classifier 114. The classification identifier relating to the detected object is then sent to the loss function 122 in the apprentice classification module 104, step 216. The process then returns to step 202 for receipt of new image data. The repetition of a training loop may be performed as fast as possible. In some embodiment, the training may be limited to the classifications having good enough confidence values. In some embodiments the training is performed on live data and in some embodiments it is performed on recorded data that registered or captured at points in time that suggest that the data represents the same event or object. Continuing the description of the training process by looking at the processing of the data from the second sensor in FIG. 6, the sensor data from the second sensor is received, step 252, as previously mentioned. Then the features relating to the cropping and object detection, described in connection with the description of FIG. 5, is received from the tutor classification module 102, step 254. The features are translated to values that are relevant for the type of data delivered by the sensor in order to enable correlation between positions in the data sets from the two sensors 106, 108, step 256. Cropping parameters are then determined using at least some translated values from the tutor classification module 102, step 258. The data from the second sensor 108 is then cropped using these cropping parameters, step 260, and the cropped data is inputted into the apprentice classifier 120, step 262. The apprentice classifier 120 then generates a classification identifier of the object in the processed cropped data, step 264. The classification identifier generated by the apprentice classifier 120 is then received at the loss function calculator 122, where the loss function is calculated from the classification identifier received from the apprentice classifier 120 and the classification identifier received from the tutor classifier 114, step 266. The calculated loss function is then used for generating weight adjustments for the apprentice classifier, step 268. The weight adjustments are then introduced in the apprentice classifier in order to improve the classification accuracy, step 270. The process then returns to step 252 for receipt of new image data.

As described above in relation to some embodiments, the image data captured by the first sensor 106 and the data captured by the second sensor 108 should both include data representing the same object at the same moment in time, e.g. the data should be captured at essentially the same point in time or covering overlapping time periods.

In some embodiments of the invention the apprentice classification module may be arranged to process a sequence of sensor data sets, i.e. a plurality of sensor data sets captured sequentially at different time points. Examples of this type of sequential data are, motion video, audio, radar, sequences of still images, etc.

Figure 7:
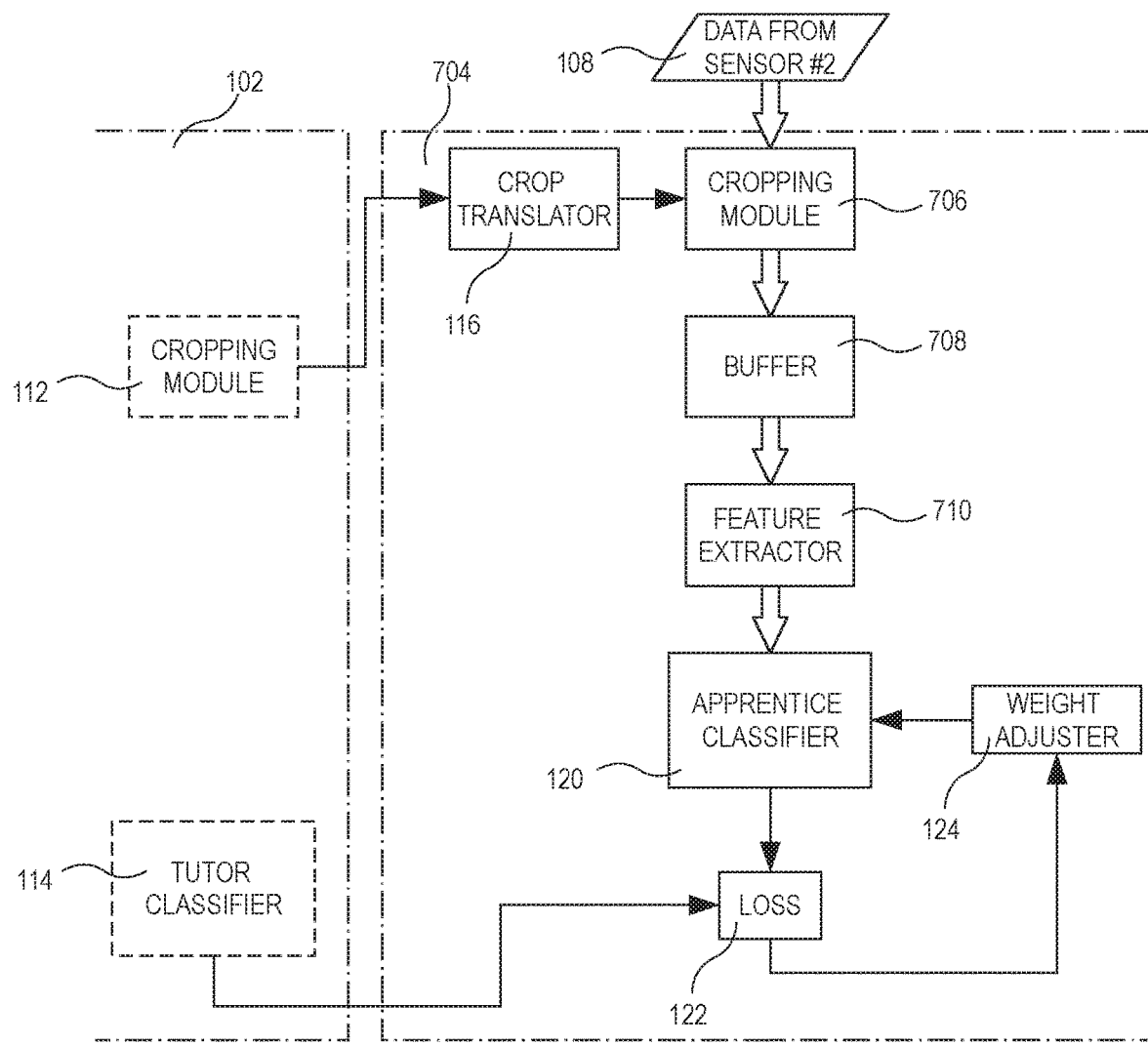
FIG. 7 is a schematic block diagram of an apprentice portion of the training system according to an alternative embodiment.

An example of an apprentice classification module arranged to handle these situations, i.e. processing a sequence of sensor data sets, are depicted in FIG. 7. The apprentice classification module 704 includes a crop translator 116 similar to the one described in FIG. 3 and a cropping module 706. The cropping module may be arranged to initially find the object or the event in the sensor data by using the translated crop data from the tutor classification module and then track the object or the event initially found in order to crop relevant data. When the data relates to motion video the cropped data could be a subset of data representing a tighter rectangle surrounding the object of interest. For some sensor data cropping of data makes no sense and will in those cases be skipped, e.g. sensor data from a single microphone or other sensor data having no spatial information relating a data point spatially to another data point. The apprentice classification module further includes a buffer 708, a feature extractor 710, the apprentice classifier 120, the loss function 122, and the weight adjuster. The buffer 708 is arranged to buffer the sequence of cropped data from the sensor, or the sequence of data if no cropping is performed. The feature extractor 710 operates on the data in the buffer to find and extract features from the sequence, e.g. angular movement, change in distance, object speed, changes in shape of the object, movement characteristics, etc. These features from the feature extractor will then be used as inputs to the apprentice classifier which will be trained on these features in order to identify them as belonging to a class identified in the tutor classification module 102. The apprentice classifier 120, the loss function 122, and the weight adjuster are very much the same devices and/or modules as described in connection with FIG. 3.

In all previous example embodiments the sensor data has been described as originating from different sensors. However, the sensor data received by the tutor classification module 102 and the sensor data received by the apprentice classification module 104; 704 may originate from the same sensor but delivering different sensor data. For example, the tutor classification module 102 may receive image data representing a still picture and the apprentice classification module 104; 704 may receive motion video data, i.e. a sequence of video frames, from the same sensor. The advantages of training classification of objects in the video data based on a classification of an object in the still image may be the same as for the corresponding training using data from different sensors. An additional advantage may be that the training of classifying an object using motion video data is that motion patterns of the object may be added to a final classification system and that the likelihood of making a correct classification will be increased. Motion patterns may for instance be the gait of a human or an animal. In another example the sensor data received by the tutor classification module 104; 704, may originate from the same sensor which is delivering both image data based on visible light and image data based on infrared light. Such a sensor may be an RGB-IR sensor.

The invention claimed is:

1. Method for training a classifier, the method comprising:
capturing sensor data at a first and a second sensor, respectively, at corresponding points in time,
generating by the first sensor a first set of sensor data including data representing an object or an event in a monitored environment,
generating by the second sensor a second set of sensor data representing a corresponding time period as a time period represented by the first set of sensor data,
inputting to a tutor classifier data representing the first set of data and including data representing the object or the event,
generating a classification of the object or event in the tutor classifier,
receiving the second set of sensor data at an apprentice classifier training process,
receiving the classification generated in the tutor classifier at the apprentice classifier training process, and
training the apprentice classifier in the apprentice classifier training process using the second set of sensor data as input and using the classification received from the tutor classifier as a ground-truth for the classification of the second set of sensor data.

2. Method according to claim 1, wherein the first set of sensor data sent to the tutor classifier is a subset of the first set of sensor data including the object or the event, wherein the subset of the first set of sensor data represents sensor data relating to a spatial position of the object or the event in a monitored environment, and wherein the second set of sensor data sent to the apprentice neural network represents a subset of the second sensor data, wherein the subset of the second sensor data represents data relating to the corresponding spatial position in the monitored environment as the subset of the first set of sensor data.

3. Method according to claim 2, wherein the sensors are image sensors, wherein the first set of sensor data is a still image, and wherein the second set of sensor data is a sequence of video frames.

4. Method according to claim 1, wherein the first sensor and the second sensor are arranged to generate data from different types of sensor inputs.

5. Method according to claim 4, wherein the first sensor is an image sensor and wherein the second sensor is any sensor type from the group of radar sensor, audio sensor, sound field sensor, LIDAR sensor, sensor for laser absorption spectroscopy, sonar sensor, radiation sensor, X-ray sensor, ultra sound.

6. Method according to claim 5, wherein the image sensor is a sensor registering visible light.

7. Method according to claim 4, wherein the first sensor is a sensor registering visible light and the second sensor is a sensor registering infra-red light.

8. Method according to claim 1, wherein the tutor classifier is based on a neural network.

9. Method according to claim 1, wherein the apprentice classifier is based on a neural network.

10. System arranged to train a classifier, the system comprising:
a first sensor and a second sensor configured to capture sensor data at corresponding points in time,
a tutor classifier arranged to receive a first set of sensor data generated by the first sensor and including data representing an object or an event in a monitored environment and to generate a classification of the object or event,
an apprentice classifier arranged to be trained wherein the training includes receiving a second set of sensor data generated by the second sensor and representing a corresponding time period as a time period represented by the first set of sensor data,
a loss value calculator arranged to receive an output classification from the tutor classifier, to receive an output classification from the apprentice classifier, and to calculate a loss value identifying a difference between the two received classifications, and
a weight adjuster arranged to adjust weights in the apprentice classifier in response to the loss value calculated by the loss value calculator.

11. System according to claim 10, wherein a sensor is an image sensor.

* * * * *